US010761835B1

United States Patent
Koppel

(10) Patent No.: US 10,761,835 B1
(45) Date of Patent: Sep. 1, 2020

(54) RUN-TIME APPLICATION MODIFICATION

(71) Applicant: Apptimize LLC, Menlo Park, CA (US)

(72) Inventor: James Brandon Koppel, Cambridge, MA (US)

(73) Assignee: Apptimize LLC, San Francisco, CA (US)

(*) Notice: Subject to any disclaimer, the term of this patent is extended or adjusted under 35 U.S.C. 154(b) by 0 days.

(21) Appl. No.: 14/883,204

(22) Filed: Oct. 14, 2015

Related U.S. Application Data

(63) Continuation of application No. 14/727,468, filed on Jun. 1, 2015, now abandoned.

(60) Provisional application No. 62/005,048, filed on May 30, 2014.

(51) Int. Cl.
| | |
|---|---|
| *G06F 9/44* | (2018.01) |
| *G06F 8/656* | (2018.01) |
| *G06F 8/34* | (2018.01) |
| G06F 9/54 | (2006.01) |
| G06F 8/61 | (2018.01) |
| G06F 9/455 | (2018.01) |
| G06F 9/22 | (2006.01) |

(52) U.S. Cl.
CPC ............ *G06F 8/656* (2018.02); *G06F 8/34* (2013.01); *G06F 8/61* (2013.01); *G06F 9/22* (2013.01); *G06F 9/544* (2013.01); *G06F 2009/4557* (2013.01)

(58) Field of Classification Search
CPC .......... G06F 8/61; G06F 9/45558; G06F 2009/4557; G06F 8/34; G06F 8/41; G06F 8/4434; G06F 8/4441; G06F 8/656; G06F 8/71; G06F 9/22; G06F 9/4484; G06F 9/45516; G06F 9/45525; G06F 9/544
USPC .................. 717/120, 136, 168, 175
See application file for complete search history.

(56) References Cited

U.S. PATENT DOCUMENTS

| | | | | |
|---|---|---|---|---|
| 6,151,703 | A * | 11/2000 | Crelier | G06F 9/449 717/136 |
| 8,136,100 | B1 * | 3/2012 | Goldman | G06F 8/61 717/120 |
| 2008/0184210 | A1 * | 7/2008 | Lee et al. | G06F 8/4441 717/136 |
| 2015/0160931 | A1 | 6/2015 | Glazer et al. | |

* cited by examiner

*Primary Examiner* — Wei Y Zhen
*Assistant Examiner* — Mohammed N Huda
(74) *Attorney, Agent, or Firm* — Fenwick & West LLP

(57) ABSTRACT

An application includes main program code, but also a call handler and an update module. When a specific method or function in the operating system is called, the call is redirected to the call handler in the application. The call handler then calls the function in the operating system. The function retrieves an object to present in a user interface to the application. But before the object is rendered, program control is returned to the call handler, which calls into the update module. The update module determines whether or not the appearance of the object should be changed, for example, in accordance with an A/B test or any other type of update. If so, visual characteristics of the object are changed. Control reverts back to the operating system from the call handler and the object, in its changed form, is presented in the user interface.

20 Claims, 7 Drawing Sheets

RUN-TIME APPLICATION MODIFICATION

RELATED APPLICATIONS

This application is a continuation of and claims priority to U.S. patent application Ser. No. 14/727,468, entitled "Run-Time Application Modification," and filed on Jun. 1, 2015, which is hereby incorporated by reference in its entirety. This application is also related to and claims priority to U.S. Patent Application No. 62/005,048, entitled "Systems and Methods for Notifying Software Development Environments of Application Code Modifications," filed on May 30, 2014, which is hereby incorporated by reference in its entirety.

TECHNICAL BACKGROUND

Mobile application environments present many challenges to the seamless and graceful presentation of application user interfaces. Developers are therefore motivated to constantly improve their applications to improve the user experience, as well as to utilize memory, processor, and batter resources efficiently. However, application updates, especially in the mobile space, can be time consuming and themselves resource intensive as most updates are pushed down to devices from an app store or other such channels. To avoid such drawbacks, many software vendors employ A/B testing to test various application updates on a limited number of users before distributing them to a wider audience.

In a brief example, a developer may wish to test two color schemes in a user interface. One color scheme is tested on one set of users, while the other color scheme is tested on another set of users. Depending on the outcome of the test, one or the other of the color schemes may be incorporated into an update that is distributed more broadly. To carry out the tests on the mobile devices typically requires an on-the-fly modification of the application in its original form. For example, when an object is being retrieved from memory for display in a user interface (such as an object in a list), its color must be changed from its original color to the new color being tested.

Some solutions accomplish color changes (and other modifications to a user interface) by monitoring for when specific objects are being loaded and then changing their parameters in order to affect the color change. However, such techniques can result in flashes or other artifacts in the user interface. For example, a developer may wish to change the tenth item in a view of one-thousand items presented by an application. As a user scrolls through the view, a testing module installed on the device monitors for when the tenth item is brought into view in the user interface. When the tenth item appears, it is first presented in its old color and then is changed to its new color, which causes a noticeable flash in the user interface as the color changes.

OVERVIEW

Technology is disclosed herein that enhances how elements in a user interface may be changed at run-time. Rather than changing the appearance of an object (e.g. its color) after it has been rendered in a user interface, code is employed that changes visual characteristics of the object after it is retrieved, but before it is displayed. In this manner, flashes and other visual artifacts are mitigated.

In an implementation, an application includes main program code, but also a call handler and an update module. When a specific method or function in the operating system is called, the call is redirected to the call handler in the application. The call handler then calls the function in the operating system. The function retrieves an object to present in a user interface to the application. But before the object is rendered, program control is returned to the call handler, which calls into the update module. The update module determines whether or not the appearance of the object should be changed, for example, in accordance with an A/B test or any application update. If so, visual characteristics of the object are changed. Control reverts back to the operating system from the call handler and the object, in its changed form, is presented in the user interface.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
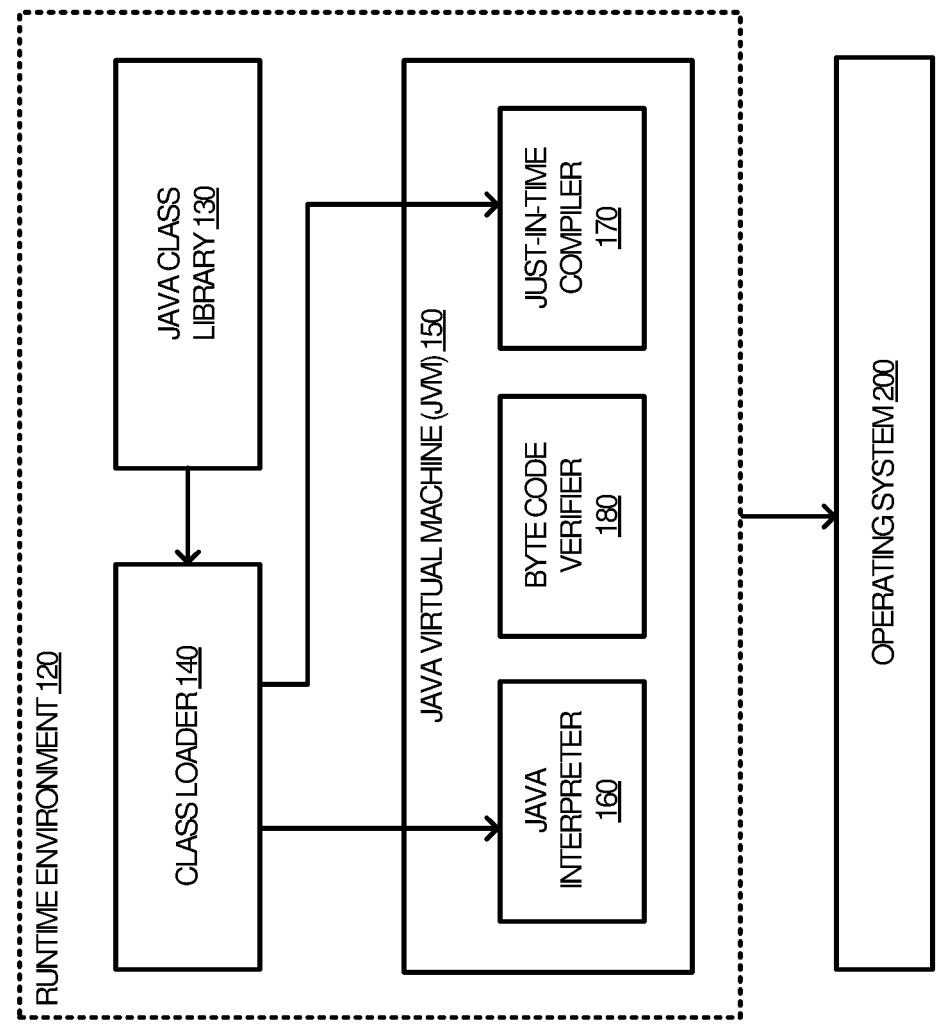
FIG. 1 is a system diagram illustrating a computing architecture for providing the systems and methods disclosed herein.

Technology disclosed herein allows for a more seamless and effective updates to mobile applications in the context of A/B testing or any other type of application update. An application may be employed in a run-time environment that includes an operating system. When the application executes, much control and responsibility for handling and presenting objects in a user interface to the application rests with the operating system and its classes, objects, methods, functions, and the like. For example, the operating system may include a class for retrieving objects and rendering the objects a user interface to the application.

The application, in addition to its main program code, may also include an update module that is invoked at various times to update elements/objects in the user interface in accordance with, for example, A/B testing constraints or any update constraints. The update module may periodically (or at some other interval) communicate with a testing service situated remotely from the device on which the update module runs. The application may further include a call handler that is "hooked" into a method of the operating system, such that when the operating system method is called, the call handler is executed instead of the implementation code associated with the method.

In some examples, the method of the operating system may be one that is responsible for retrieving an object or objects for presentation in the user interface. This may occur when a user navigates to a new view that requires loading of new objects that were not previously in view.

When the scrolling occurs, the operating system calls the method responsible for loading the objects. But because that method is hooked (or swizzled), the call handler is invoked instead. The call handler immediately calls the code associated with the hooked method so that the object can be retrieved. But because it is the call handler that invokes the code, the code returns control to the call handler after it has executed.

With the object retrieved from persistent storage or memory, control is returned to the call handler, which then calls the update module. The update module determines whether or not the retrieved object is subject to an update (an A/B test, for instance). The update module determine things such as whether or not the color, font, or other visual characteristics of the object should be changed in accordance with an update.

Assuming a visual characteristic should be changed, the update module instructs the call handler what to change about the object. The call handler implements that change, such as by changing the color of the object or the like. When the call handler has completed its modification of the object, the call handler—having been invoked when the operating system called the hooked method—returns control to the operating system.

The operating system proceeds to render the object in the user interface. And since the call handler changed the color of the object, the object is displayed with the new color in accordance with the test.

In a more specific example, a system described herein hooks one of the internal methods of a ListView object (an operating system element). ListView will now call into Apptimize code (call handler) all of the time, including every time it brings a new item onto the screen because its method is hooked. That means that code can run to change the color or un-change the color of items right before they are drawn to the screen (or any visual characteristics). There is no flicker, and every item is exactly the color it should be.

More particularly, a user may be interacting with the ListView object, scrolling. Android code is running to update the screen and display things; the application and Apptimize code are not doing much. As the user scrolls down, there is no space for a new item at the bottom of the ListView. As part of the ListView's normal operation, it will call a method, one example of which is fillGalleryFromBottom.

"FillGalleryFromBottom" is method that is not normally marked as native. However, because "fillGalleryFromBottom" is marked as "native," the JVM will not call the ListView object's fillGalleryFromBottom method. Instead, it will call Apptimize's provided JNI function, callHandler.

The callHandler function will invoke the original fillGalleryFromBottom function, which will perform its normal operation of adding a new item at the bottom of the screen, to be displayed next time the screen renders.

After the original fillGalleryFromBottom function finishes, control returns to the callHandler function. CallHandler now calls into Apptimize's Java code, informing it that "fillGalleryFromBottom" has just run, and passing in additional information (e.g.: which ListView object) as arguments. This piece of Apptimize code proceeds to e.g.: check if the newly added items should have their color changed, and changes their color if so.

After the Apptimize Java code finishes, control returns to the JNI function, callHandler. CallHandler now finishes and control returns to the ListView object, at the point in its code immediately following the point at which it was hijacked. The app continues running as normal. Sometime later, the screen is rendered, and the user sees the color-changed new item as if it was always like that.

In another technical advantage, the systems disclosed herein allow an Android program to modify a different Android app without changing its code by hijacking the runtime. Such runtime modification can be applied to user-level code, whereas other solutions require a specially-customized device where some of the critical system files have been modified. (This also requires restarting the OS every time you change something.) The systems disclosed herein allow an application to be modified without modifying the system software and without having root privileges.

Other aspects of the present disclosure involve systems and/or methods for automatically notifying a software development environment and/or integrated development environment (referred to herein as "SDK") of a code update, failure, modification, and/or the like, being made to an application, process, and/or other code (e.g., a user-interface) that includes or is otherwise being supported by the SDK. In various aspects, the application (i.e., the user-interface) may be updated automatically without delay, for example, in real-time or near real-time. One or more code extensions may be generated that modify the functionality of the existing SDK, enabling the SDK to modify any application that includes or otherwise integrates the SDK, without requiring any redevelopment, modification, and/or expansion of the application code.

In one particular embodiment, aspects of the present disclosure may be applied within the context of the Java™ applications, the Java Development Kit™ (the JDK™), the Java Runtime Environment, and/or the JRE™ environment. The present application, however, is not limited to Java™, and is applicable to other SDKs and runtime environments, where there are code updates, failures, modifications, and/or the like, being made to an application, process, and/or other code that requires real-time and/or near real-time notification.

In the particular case of Java™ and with reference to FIG. 1, a computing architecture 100 for automatically providing notification of the code updates made to a Java™ is provided. As illustrated, a run-time environment 120 includes a Java Virtual Machine ("JVM") 150 that includes various components, such as a Java™ interpreter 160 (which may include a garbage collector), a just-in-time (JIT) compiler 170, such as the HotSpot compiler, and/or a bytecode verifier 180 to check the validity of the executable code. The run-time environment 120 may run on top of lower-level software such as an operating system 200, in some embodiments.

The JVM 150 represents a process virtual machine that executes bytecode stored or otherwise maintained within a Java™ class library 130. Generally speaking, the Java™ class library 130 represents a collection of related object code, packaged in one or more Java Archive (JAR) files. A common type of object contained in a JAR file is a Java™ class file that represents a named, distinct unit of code.

Class files from the Java™ class library 130 may be identified by the class-loader 140 to load classes in the JVM 150. More specifically, the class-loader 140 is responsible for locating Java™ class files in the Java™ code library 130, reading their contents, and loading the classes into the JVM 150. The loading is performed dynamically, in that it does not occur until the class is actually requested by an executing computer program or software application. In the illustrated embodiment, code is loaded from the Java™ class library 130 into the JVM 150 (e.g., from a disk or over a network) by the class-loader 140. Thus, when the JVM 150 would load bytecode for a particular class, it requests the class-loader 140 to find the bytecode.

Figure 2:
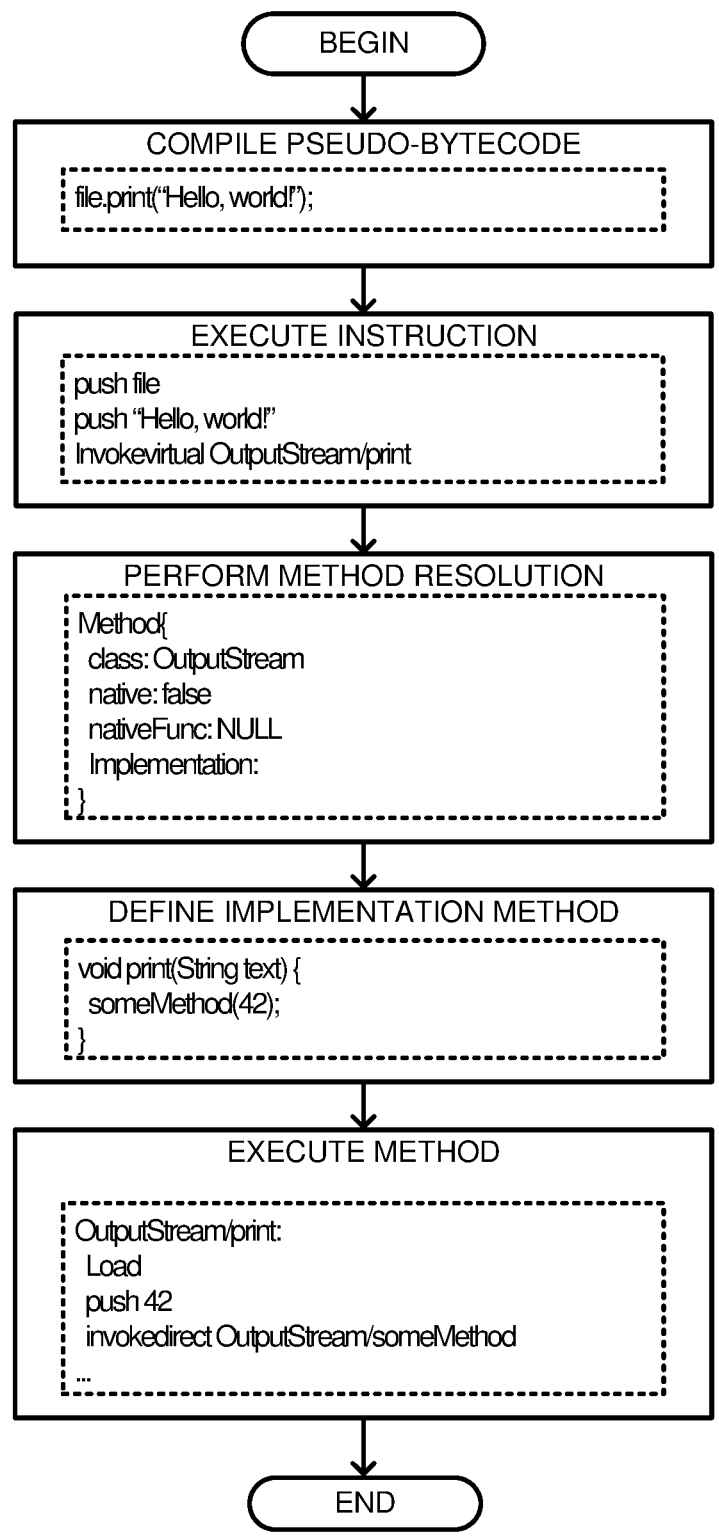
FIG. 2 is a flowchart illustrating one method for extending functionality of code, according to one embodiment disclosed herein.

FIG. 2 provides an illustration of a process for executing Java™ code. In the illustrated embodiment, the line "file.print('Hello, world')" is compiled into three lines of pseudo-bytecode. The JVM 150 executes the instruction "invokevirtual OutputStream/print," which is intended to call the "print" method defined in the "OutputStream" class or one of its subclasses. To execute the lines of code, the JVM 150 performs "method resolution," and locates an internal table representing information about the corresponding method. The internal table contains a reference to more bytecode (typically compiled from another source file), which defines the implementation of the method. Upon completion of the interpretation of the instruction, the JVM 150 begins executing the bytecode implementing the method (the JVM will also save information so that it can resume executing the calling method when the OutputStream/print method returns).

Java™ offers a Java Native Interface ("JNI"), which allows developers to specify whether a particular method has been implemented in machine code that will be run directly by the CPU, instead of being implemented in Java bytecode. Typically, such machine code will have been compiled from a language other than Java™, such as C or C++. Various SDKs contain an implementation of a JVM that allows developers to execute code written using the JNI. For example, the Android™ SDK includes a JVM that allows developers to execute code written using the JNI. Thus, aspects of the present disclosure may be implemented using and/or within the Android development environment.

Figure 3:
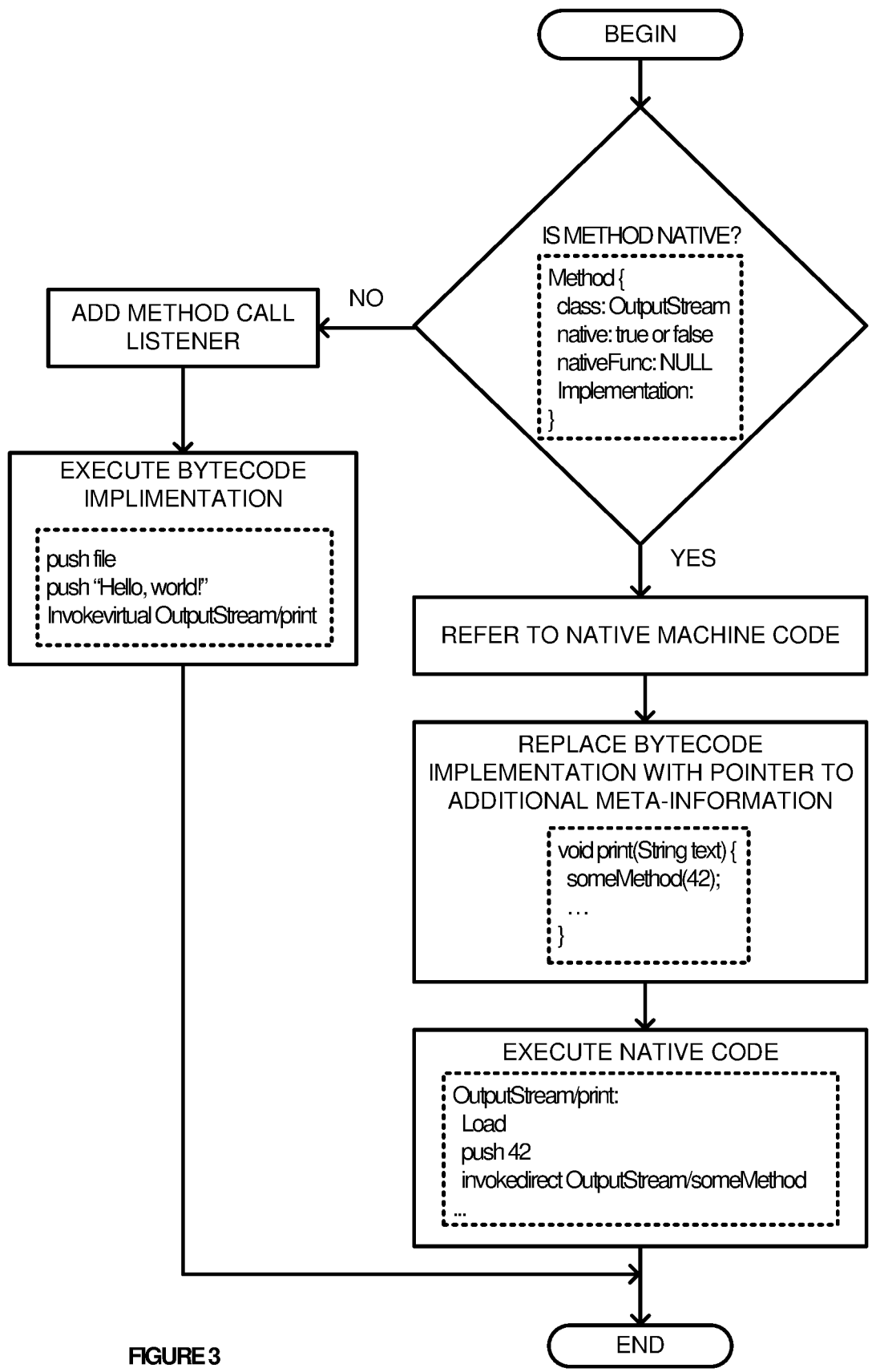
FIG. 3 is a flowchart illustrating one method for providing code modifications, according to one embodiment described herein.

FIG. 3 provides an illustration of a process for extending or otherwise modifying Java™ code to provide notifications during execution. As illustrated, the JVM may internally represent methods using a flag that indicates whether that method's implementation consists of Java bytecode or native machine code. If the flag is set to true, the internal table representing the method will also contain a reference to the corresponding native function. Consider an arbitrary normal bytecode function, and suppose some code were to change the "native" flag on a method's table to "true." Next time the JVM attempted to invoke this method, it would execute the machine code to which its "nativeFunc" attribute is pointing, instead of executing the bytecode implementing the function. By setting the native code attribute appropriately, the system may replace any Java™ function with code the system identifies. Because the reference to the bytecode implementation will be unused, the system can replace it with a pointer to additional meta-information about the method, which may contain a reference to the original bytecode implementation. This reference will enable the native code to invoke the original implementation during its execution and without any additional user development.

As illustrated, the JVM 150 internally represents methods using a flag that indicates whether that method's implementation consists of Java bytecode or native machine code. If the flag is set to true, the internal table representing the method will also contain a reference to the corresponding native function. In various embodiments, the system (e.g., via the mechanism described above) may change or otherwise set the "native" flag on a method's table to "true." Next time the JVM attempts to invoke this method, it will execute the machine code to which its "nativeFunc" attribute is pointing, instead of executing the bytecode implementing the function. By setting the native code attribute appropriately, the system may replace any Java™ function with code the system identifies. Because the reference to the bytecode implementation will be unused, the system may replace it with a pointer to additional meta-information about the method, which may contain a reference to the original bytecode implementation. This reference will enable the native code to invoke the original implementation during its execution and without any additional user development. By invoking the original implementation with some additional code running before or after, the system may implement a technique known as "hooking" or "swizzling."

An example of an application of various aspects of the present application will now be provided. Many applications (e.g., mobile applications) load their data dynamically. For example, in the Groupon app, when a user interacting with the app selects a specific coupon deal to purchase a service or good, the app will display a "Loading" animation while it downloads detailed information about the selected deal (i.e., deal information). Shortly afterwards, the app will change or otherwise update the user-interface elements on the display page required to display the detailed information, and then immediately display the page to the user.

Suppose the creator of the app wishes to modify the user-interface for A/B testing, perhaps by changing the size of the text. However, when the app downloads the data, it calls "setTextSize" on some of the elements as part of changing the page to display the deal information. The system of the present disclosure may, immediately after the first call to setTextSize completes, check the meta-data corresponding to the setTextSize method, and, if need be, call setTextSize again to change the text size to what the creator wishes to be displayed as part of the test. If the system changes the text size earlier, the changes will be overridden. If the system changes the text size later, then there will be a brief "flash" as the page displays the text in the first text size, and then changes it to the other version. The system achieves such functions by extending or otherwise modifying the setText method to add a "method call listener," so that the relevant code in the SDK can run immediately after every call to setTextSize, avoiding any delays. Instead of an application developer needing to modify their code to perform all necessary integration with our product, our product itself does the integration for them, without requiring them to make any changes to how they compile or create their application.

A technical advantage that may be appreciated from the systems disclosed herein, is that the system may achieve such functions technique using JNI code shipped with an app, without requiring any rooting by the end user. Stated differently, the systems described herein do not require users to "root" the device executing the application to gain privileges to modify the application and files freely, such as for example, by installing a customized operating system, or by exploiting some security vulnerability.

Figure 4:
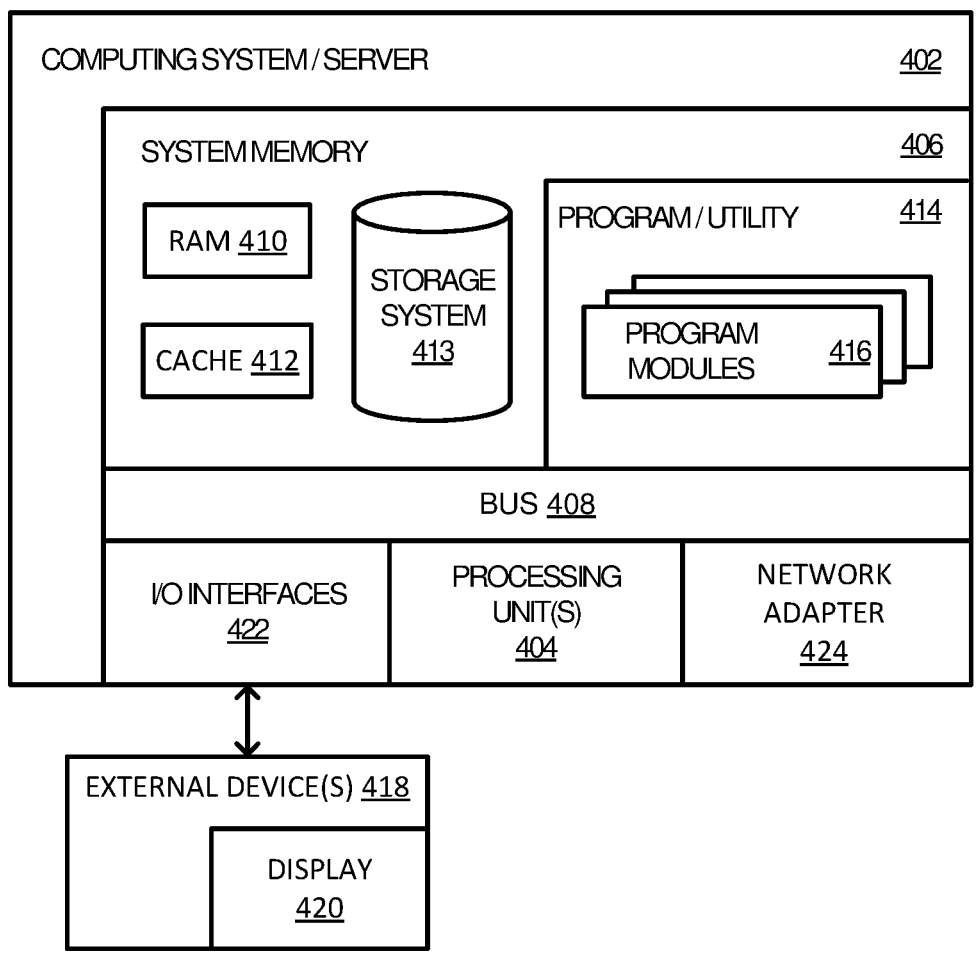
FIG. 4 is an example computing system that may implement various systems and methods discussed herein, according to one embodiment described herein.

FIG. 4 illustrates an example of a computing node 400 which may be used to implement aspects of the present disclosure. The computing node 400 represents one example of a suitable computing device and is not intended to suggest any limitation as to the scope of use or functionality of embodiments of the invention described herein. Regardless, the computing node 400 is capable of being implemented and/or performing any of the functionality described above.

As illustrated, the computer node 400 includes a computer system/server 402, which is operational with numerous other general purpose or special purpose computing system environments or configurations. Examples of well-known computing systems, environments, and/or configurations that may be suitable for use with computer system/server 402 may include personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 402 may be described in the general context of computer system executable instructions, such as program modules, being executed by a computer system. Generally, program modules may include routines, programs, objects, components, logic, data structures, and so on that perform particular tasks or implement particular abstract data types. Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 402 in computing node 400 is shown in the form of a general-purpose computing device. The components of computer system/server 402 may include one or more processors or processing units 404, a system memory 406, and a bus 408 that couples various system components including system memory 406 to processor 404.

Bus 408 represents one or more of any of several types of bus structures, including a memory bus or memory controller, a peripheral bus, an accelerated graphics port, and a processor or local bus using any of a variety of bus architectures. Such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 406 may include computer system readable media in the form of volatile memory, such as random access memory (RAM) 410 and/or cache memory 412. Computer system/server 402 may further include other removable/non-removable, volatile/non-volatile computer system storage media. By way of example only, storage system 413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 408 by one or more data media interfaces. As will be further depicted and described below, memory 406 may include at least one program product having a set (e.g., at least one) of program modules that are configured to carry out the functions of embodiments of the invention.

Program/utility 414, having a set (at least one) of program modules 416, may be stored in memory 406, as well as an operating system, one or more application programs, other program modules, and program data. The operating system, one or more application programs, other program modules, and program data, or some combination thereof, may include an implementation of a networking environment. Program modules 416 generally carry out the functions and/or methodologies of embodiments of the invention as described herein.

Computer system/server 402 may also communicate with one or more external devices 418 such as a keyboard, a pointing device, a display 420, etc.; one or more devices that enable a user to interact with computer system/server 402; and/or any devices (e.g., network card, modem, etc.) that enable computer system/server 402 to communicate with one or more other computing devices. Such communication can occur via Input/Output (I/O) interfaces 422. Still yet, computer system/server 402 can communicate with one or more networks such as a local area network (LAN), a general wide area network (WAN), and/or a public network (e.g., the Internet) via network adapter 424. As depicted, network adapter 424 communicates with the other components of computer system/server 402 via bus 408. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

The embodiments of the present disclosure described herein are implemented as logical steps in one or more computer systems. The logical operations of the present disclosure are implemented (1) as a sequence of processor-implemented steps executing in one or more computer systems and (2) as interconnected machine or circuit engines within one or more computer systems. The implementation is a matter of choice, dependent on the performance requirements of the computer system implementing aspects of the present disclosure. Accordingly, the logical operations making up the embodiments of the disclosure described herein are referred to variously as operations, steps, objects, or engines. Furthermore, it should be understood that logical operations may be performed in any order, unless explicitly claimed otherwise or a specific order is inherently necessitated by the claim language.

Figure 5:
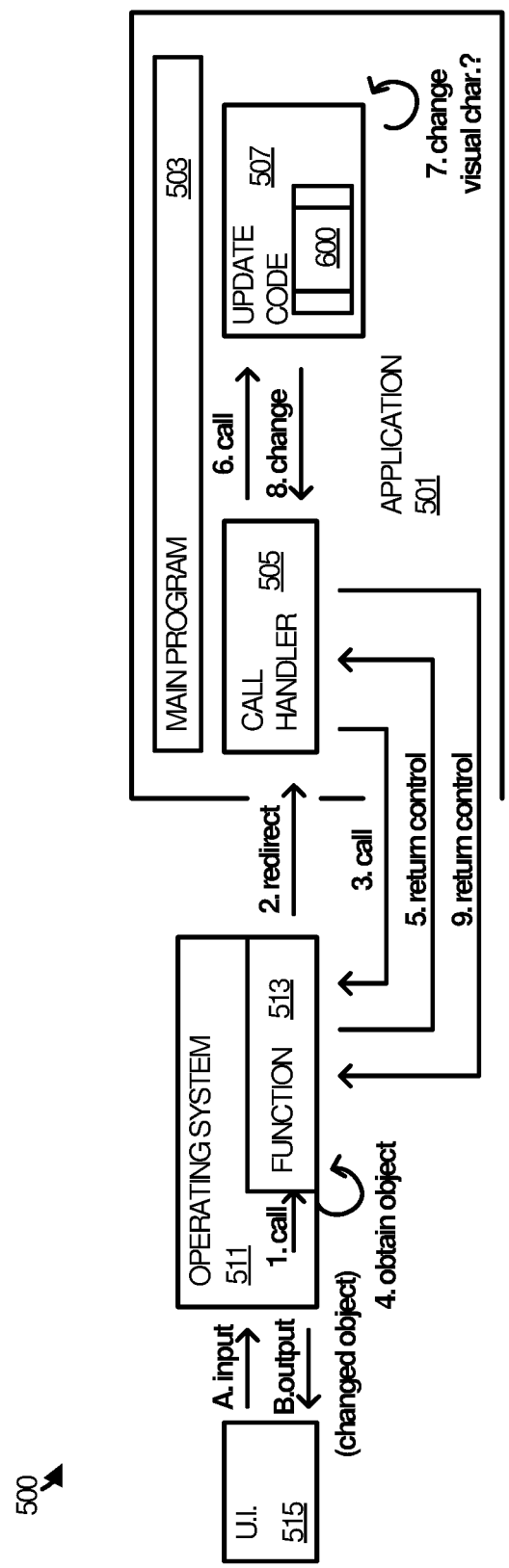
FIG. 5 illustrates an implementation of enhanced user interface modification.

FIG. 5 illustrates an example implementation 500 of enhanced user interface modifications. Implementation 500 involves an application 501 that includes a main program 503, a call handler 505, and update code 507. Implementation 500 also involves an operating system 511 that includes a function 513. Application 501 interacts with operating system 511 to drive user interface 515.

Application 501 is representative of any application suitable for installing on a computing device and integrating with a call handler and update code. Examples of application 501 include, but are not limited to, mobile applications that may be downloaded and installed from an app store, or that come pre-installed on a device. Other examples include any type of locally installed and executed application, no matter its origin or distribution channel. Other types of applications, such as desktop applications, streaming applications, or any combination or variation thereof are also representative.

Update code 507 may be implemented as a single, discrete piece of code, or may be implemented using multiple discrete pieces of code. For example, update code 507 may include one or more logical parts that hook a method, while also including one or more other logical parts that call handler 505 checks with to determine if an object has been updated.

In some scenarios, call handler 505 and update code 507 may be provided by an entity other than the developer of application 501. Such third parties may develop tools that allow call handler 505 and update code 507 to be integrated with applications. In other scenarios, call handler 505 and update code 507 may be developed by the same entity that develops application 501 and may be developed in the context of application 501.

In operation, an element in operating system 511 initiates a call into function 513 to obtain an object for display in user interface 515. This may occur in response to user input, such as a scroll, click, or other such navigation.

Function 513 is a hooked function such that when it is called, call handler is invoked instead of the code implementation of the hooked function. Call handler 513 immediately calls function 513 (again) so that its actual code implementation can run. The code implementation of function 513 runs to obtain the requested object.

After obtaining the object, function 513 returns control to call handler 505. Call handler 505 then calls into update code 507 to determine whether or not the object's appearance should be modified. If so, update code 507 informs call handler 505 and the appearance of the object is changed in memory.

Call handler 505 then returns control to operating system 511 (possible to function 513 or to some other element). Operating system 511 displays the object in the user interface 515 accordingly, with the changed color or other appearance modification.

Figure 6:
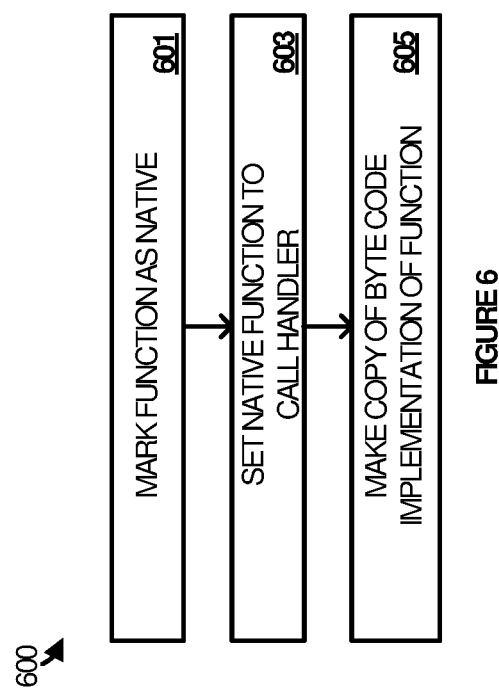
FIG. 6 illustrates a process in an implementation of enhanced user interface modification.

FIG. 6 illustrates process 600, which may be employed by update code 507 in some implementations, prior to the scenario just described above. Process 600 may be carried out by update code 507 (or some other code) in order that a call into function 513 is redirected to call handler 505 and so that call handler 505 is able to invoke the code implementation of function 513.

Referring parenthetically to process 600, when update code 507 is invoked during when application 501 is initiated, function 513 is marked as native (step 601). This means that, when function 513 is called, rather than calling its byte code implementation, native code would be called.

However, update code 507 also sets meta-data associated with function 513 such that the native code that is invoked is call handler 505 (step 603). Lastly, update code 507 creates a copy of the byte code implementation of function 513 (step 605). This allows the functionality associated with function 513 to be executed without having to execute its actual byte code implementation.

Figure 7:
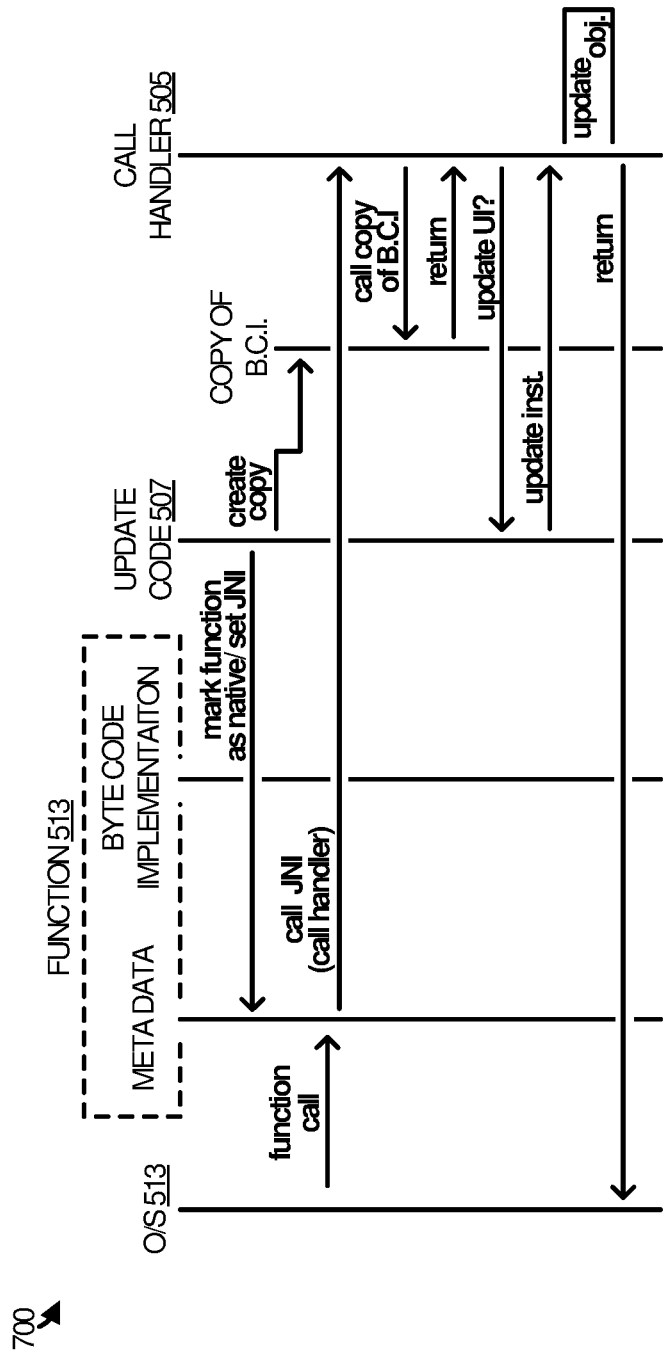
FIG. 7 illustrates an operational sequence in an implementation of enhanced user interface modification.

FIG. 7 depicts an operational sequence 700 that illustrates in more detail how process 600 provides for run-time application updates. In operation, update code 507 accesses meta-data associated with function 513 to mark function 513 as native. When a function is marked as native, a native code implementation of the function typically exists already that can be executed, rather than having to process a byte code implementation of the function into a native code implementation.

However, in operational sequence 700, the meta-data is further modified by update code 507 (or some other element running in application 501) to point to call handler 505 as the native implementation of function 513. Update code 507 also creates a copy of the byte code implementation of function 513.

When function 513 is called by operating system 513 (or some other element), the meta-data associated with function 513 causes the call to be redirected to call handler 505, because call handler is identified as the native implementation of function 513. Call handler 505 proceeds to invoke the copy of the byte code implementation of function 513 that was produced by update code 507. This allows the byte code implementation to run and, importantly, to return to call handler 505 after it has completed.

Call handler 505 then communicates with update code 507 to determine whether or not an update to a user interface element, such as a visual object, is warranted at that time. Assuming that an object update is warranted, update 507 returns an update instruction and call handler 505 updates the object in memory accordingly. Call handler 505 then returns program control to operating system 513, which renders the object in its updated state to the display.

While FIG. 7 illustrates a single operational sequence, it may be appreciated that the operations described herein operate routinely whenever function 513 is called. That is, update code 507 functions to hook function 513 such that each time function 513 is invoked, call handler 505 executes in its place. This way, nearly any or all elements in a user interface to an application may be updated at run-time while the application is executing.

It may also be appreciated that, while function 513 is representative of an operating system element that may be hooked, methods of other applications may be hooked as well. For example, a method in another application other than application 501 could be hooked, such that its user interface could be updated in real-time as it executes.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

The invention claimed is:

1. A method comprising:
   setting, using at least one processor, a flag to identify code as having a native code implementation;
   setting meta data associated with the code to identify call handler code as the native code implementation of the code;
   making a copy of a bytecode representation of the code, the copy of the bytecode associated with a modified object of an application; and
   during runtime of the application, when the code is called, invoking the call handler code instead of the code based on the flag and the meta data that identifies the call handler code as the native code implementation of the code, wherein the call handler code calls the copy of the bytecode representation of the code.

2. The method of claim 1 further comprising, after the bytecode representation of the code executes, returning control to the call handler code.

3. The method of claim 2 wherein the bytecode representation of the code retrieves the modified object of the application from storage for display in a user interface.

4. The method of claim 3 wherein the call handler code, upon the control returning from the copy of the bytecode representation of the code, checks with update code to determine whether or not to change a characteristic of the modified object.

5. The method of claim 4 further comprising the call handler code changing the characteristic of the modified object when instructed to do so by the update code.

6. The method of claim 5 wherein the characteristic comprises an appearance of the modified object.

7. The method of claim 6 wherein the appearance comprises one of at least a color, a font, a location in the user interface, and a string.

8. One or more non-transitory computer readable storage media having program instructions stored thereon that, when executed by a processor, direct the processor to at least:
set a flag to identify code as having a native code implementation;
set meta data associated with the code to identify call handler code as the native code implementation of the code;
make a copy of a bytecode representation of the code, the copy of the bytecode associated with a modified object of an application; and
during runtime of the application, when the code is called, invoke the call handler code instead of the code based on the flag and the meta data that identifies the call handler code as the native code implementation of the code, wherein the call handler code calls the copy of the bytecode representation of the code.

9. A computing device comprising:
one or more computer readable storage media;
a processor operatively coupled with the one or more computer readable storage media; and
program instructions stored on the one or more computer readable storage media that, when executed by the processor, direct the processor to at least:
set a flag to identify code as having a native code implementation;
set meta data associated with the code to identify call handler code as the native code implementation of the code;
make a copy of a bytecode representation of the code, the copy of the bytecode associated with a modified object of an application; and
during runtime of the application, when the code is called, invoke the call handler code instead of the code based on the flag and the meta data that identifies the call handler code as the native code implementation of the code, wherein the call handler code calls the copy of the bytecode representation of the code.

10. The computing device of claim 9 wherein the code comprises a method of a function in an operating system.

11. The computing device of claim 10 wherein the call handler code comprises a portion of an application that executes at a layer above the operating system.

12. The computing device of claim 11 wherein the application includes the program instructions.

13. The computing device of claim 12 wherein the application includes additional program instructions, wherein the additional program instructions comprise the call handler code.

14. The computing device of claim 13 wherein control returns to the call hander code after the copy of the bytecode representation of the code executes.

15. The computing device of claim 14 wherein the copy of the bytecode representation of the code retrieves the modified object of the application for display in a user interface to the application.

16. The computing device of claim 15 wherein the call handler code, when executed by the processor, directs the processor to check with update code to determine whether or not to change a characteristic of the modified object.

17. The computing device of claim 16 wherein the application includes the update code.

18. The computing device of claim 17 wherein the call handler code further directs the processor to change the characteristic of the modified object when instructed to do so by the update code.

19. The computing device of claim 18 wherein the characteristic comprises an appearance of the modified object.

20. The computing device of claim 19 wherein the appearance comprises one of at least a color, a font, a location in the user interface, and a string.

* * * * *